United States Patent Office 2,737,505
Patented Mar. 6, 1956

2,737,505

POLYMERIC CHLOROTRIFLUOROETHYLENE STABILIZED WITH SMALL AMOUNTS OF CHROMIC OXIDE

Robert W. Finholt, Erie, Pa., assignor to General Electric Company, a corporation of New York No Drawing. Application March 3, 1953,
Serial No. 340,149

2 Claims. (Cl. 260—45.75)

This invention is concerned with solid polymeric chlorotrifluoroethylene of improved stability and flexibility. More particularly, the invention relates to a composition of matter comprising (1) solid polymeric chlorotrifluoroethylene and (2) small amount of chromic oxide ($Cr_2O_3$).

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in its physical characteristics or in the insulating properties of the polymeric insulation. Such polymeric material is also highly desirable for many applications where a high softening point is an advantage. Thus, it is possible to mold various objects from the polymeric chlorotrifluoroethylene either with or without fillers to give useful articles which are dimensionally stable over a wide temperature range.

In the past because of the relatively high molding temperature and pressures required to effectively extrude the polymeric chlorotrifluoroethylene over electrical conductors, it has been found that the polymeric chlorotrifluoroethylene tends to degrade and in many respects becomes brittle at the elevated temperatures so that the use of the polymeric chlorotrifluoroethylene in various applications at elevated temperatures, particularly at temperatures of the order of about 175° to 200° C. has been materially curtailed.

I have now discovered that I am able to improve the stability and maintain the flexibility of the polymeric chlorotrifluoroethylene at elevated temperatures for long periods of time by incorporating in the aforesaid polymeric chlorotrifluoroethylene small amounts of chromic oxide. The amount of chromic oxide used for the purpose is relatively small and preferably ranges from about 0.001 to about 4%, by weight, preferably from about 0.01 to about 3%, by weight, based on the weight of the polymeric chlorotrifluoroethylene. When amounts of chromic oxide are used in excess of the upper ranges mentioned above, it will be found that unexpectedly the flexibility of the polymeric chlorotrifluoroethylene at the elevated temperatures is materially reduced up to a point where at around 10% concentration of the chromic oxide, no apparent advantages are ascertainable over the same polymeric chlorotrifluoroethylene from which the chromic oxide has been omitted.

The manner whereby the chromic oxide may be incorporated in the polymeric chlorotrifluoroethylene may be varied widely. One method comprises mechanically mixing together finely divided polymeric chlorotrifluoroethylene with the chromic oxide and heating the mixture to a temperature of about 150° to 200° C. and thereafter subjecting the heated mixture to vigorous stirring so as to intimately disperse the chromic oxide in the polymeric material. In this manner one may obtain molding powders suitable for various molding applications including extruding applications. A slurry may also be formed of finely divided polymeric chlorotrifluoroethylene and the chromic oxide dispersed in a suitable solvent, and thereafter mixing the ingredients together until a homogeneous mixture is obtained.

The solid polymeric chlorotrifluoroethylene employed in the practice of the present invention may be any one of those presently known and available. Generally the polymeric material is employed in the finely divided state, and for coating purposes (e. g., in the form of slurries) is advantageously of an average particle size of the order from about 0.1 to the 25 microns, and preferably from about 0.5 to 15 microns average diameter. Attainment of the finely divided state may be accomplished by grinding the polymer in a micropulverizer used for such purposes. Thereafter, the polymeric chlorotrifluoroethylene, together with the chromic oxide may be mixed in whatever fashion desired, e. g., it may be ball-milled or ground in a pebble mill, to effect satisfactory dispersion of the chromic oxide in the polychlorotrifluoroethylene. For extrusion purposes, polymeric chlorotrifluoroethylene of a much larger average particle size diameter may be used, for example, pellets, etc., may be advantageously employed.

In order that those skilled in the art may better understand how the present invention may be practiced, the following examples are given by way of illustration and not by way of limitation. All parts are by weight.

Example 1

In this example chromic oxide was mixed in varying proportions with solid polymeric chlorotrifluoroethylene (Kel-F resin manufactured by the M. W. Kellogg Company, Jersey City, New Jersey) and the mixture of ingredients molded in accordance with the procedure described below. The polymeric chlorotrifluoroethylene employed comprised one having a no strength temperature (N. S. T.) of 240° C. The N. S. T. value serves as a useful guide in the molding of plastic and has particular applicability to plastics composed essentially of polymeric chlorotrifluoroethylene. The measurement of the N. S. T. value is more particularly described in U. S. Patent 2,617,152, issued November 11, 1952.

In each of the runs described below, the chromic oxide was mixed with the finely divided polymeric chlorotrifluoroethylene and the mixture ball-milled for a sufficient length of time to effect intimate dispersion of the chromic oxide in the polymeric chlorotrifluoroethylene. Each formulation was then pressed into sheets using a Carver press employing a platen temperature of about 250° C., a pressure of about 10,000 p. s. i., and a pressing time of about 30 seconds. Each of the molded sheets was then heated for varying lengths of time at 175° C., and small strips, 1½″ x ¼″, were cut off periodically for flex testing. The number of flexes (which comprised creasing the strip by folding it back on itself and then reversing 360°) required to break the modified samples in two, as well as the control sample from which the chromic oxide was omitted, are disclosed in the following Table I. The percents chromic oxide recited in the table are all, by weight, based on the weight of the polymer.

TABLE I

*Number of flexes to failure*

| Days at 175° C. | 0 | 10 | 14 | 21 | 28 |
|---|---|---|---|---|---|
| Percent $Cr_2O_3$: | | | | | |
| 10 | 80 | 2 | 2 | 2 | None |
| 5 | >100 | 2 | 2 | None | None |
| 1 | >100 | >100 | >100 | >100 | >100 |
| 0.5 | >100 | >100 | >100 | 10 | None |
| 0.01 | >100 | 110 | 90 | 10 | None |
| 0.001 | >100 | 5 | 6 | 10 | None |
| 0.00 (Control) | >100 | 6 | 2 | None | None |

It will be noted from an examination of the above table that the improved effect of incorporating the chromic oxide in an amount equal to about 0.001% chromic oxide does not become apparent until after more extensive heat aging. On the other hand it will be noted that certain amounts, for instance, 1% chromic oxide, maintained the flexibility of the polymeric chlorotrifluoroethylene at a relatively high rate even after 28 days of heating at 175° C.

Obviously, benefits may be derived from the incorporation of varying amounts of chromic oxide up to about 3 to 4 percent, by weight, of the polymeric chlorotrifluoroethylene. The actual amount of chromic oxide (within the above range) used in the practice of the present invention will be dictated by many factors including the type of polymeric chlorotrifluoroethylene used, the application for which the polymeric material is to be employed, the degree of flexibility desired, the temperature at which the polymeric chlorotrifluoroethylene will be used, etc. The flexibility of the polymeric chlorotrifluoroethylene may be maintained for even longer periods of time at 150° C. as a result of the incorporation of the chromic oxide in the polymeric chlorotrifluoroethylene. In any event, no matter what the type of polymeric chlorotrifluoroethylene employed, nor the temperature at which it will be used, the improved results of stability and flexibility will be noted as a result of the incorporation of the small amounts of chromic oxide described above.

The modified polymeric chlorotrifluoroethylene herein described and claimed may be employed in various applications. Thus, the polymeric material containing the chromic oxide may be used in molding applications where advantage may be taken of the improved heat resistance and flexibility of the molded product. These molding compositions may be used as gaskets, as encapsulating materials for electrical coils and other electrical devices, etc. One of the main uses of the compositions herein described is for insulating electrical conductors. Electrical conductors insulated with the polymeric chlorotrifluoroethylene modified with varying amounts of the chromic oxide have good heat resistance and electrical properties. The presence of the chromic oxide enables the insulated conductor to remain flexible at elevated temperatures for long periods of time, and thereby permits the use of such insulated conductors in motors which can be operated at elevated temperatures with attendant obvious advantages.

What I claim as new and desire to secure by Letters Patent of the United States is:

1. A composition of matter having improved flex life at elevated temperatures comprising (1) solid polychlorotrifluoroethylene and (2) from 0.001 to 4.0 percent, by weight, chromic oxide, based on the weight of the polychlorotrifluoroethylene.

2. The process for improving the flexibility of polychlorotrifluoroethylene at elevated temperatures which process comprises incorporating in the aforesaid polymer, chromic oxide in an amount equal to from about 0.001 to 4 percent, by weight, based on the weight of the polychlorotrifluoroethylene, and thereafter molding the aforesaid modified polychlorotrifluoroethylene.

References Cited in the file of this patent

UNITED STATES PATENTS

| | | |
|---|---|---|
| 2,206,636 | Hunter | July 2, 1940 |
| 2,430,589 | Sloan | Nov. 11, 1947 |
| 2,463,983 | Leatherman | Mar. 8, 1949 |
| 2,685,707 | Llewellyn et al. | Aug. 10, 1954 |
| 2,686,738 | Teeters et al. | Aug. 17, 1954 |

OTHER REFERENCES

Matiello: Protective and Decorative Coatings, vol. 2, 1942, page 273.

Hackh's Chemical Dictionary, 3rd edition, 1944, page 198.